Patented June 30, 1925.

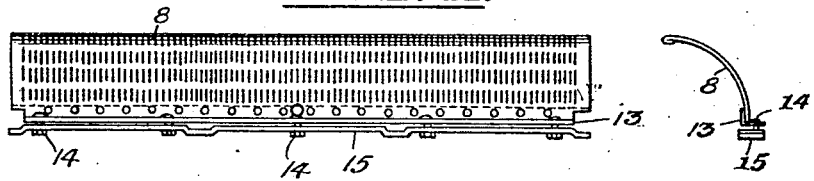
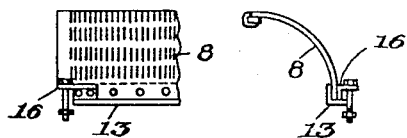
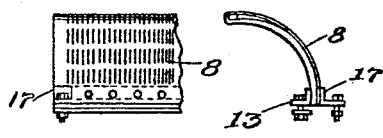
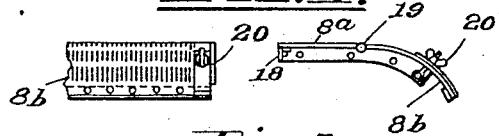
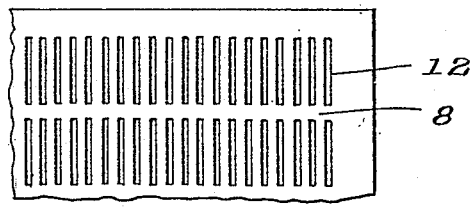
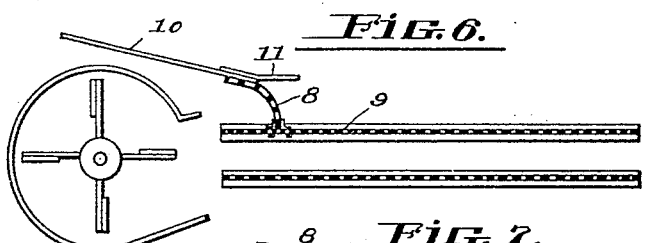
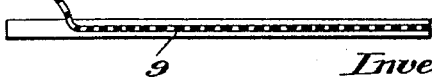

1,544,494

UNITED STATES PATENT OFFICE.

ARTHUR GUSTAV HENRY SPOEHR AND AUGUST CARL EDARDT SPOEHR, OF MINTARO, SOUTH AUSTRALIA, AUSTRALIA.

ATTACHMENT TO THE GRAIN-CLEANING DEVICE OF A GRAIN-HARVESTING MACHINE.

Application filed March 7, 1925. Serial No. 13,822.

*To all whom it may concern:*

Be it known that we, ARTHUR GUSTAV HENRY SPOEHR and AUGUST CARL EDARDT SPOEHR, subjects of the King of Great Britain and Ireland, and residents of Mintaro, State of South Australia, Commonwealth of Australia, have invented a certain new and useful Attachment to the Grain-Cleaning Device of a Grain-Harvesting Machine, of which the following is a specification.

With the grain cleaning devices of grain harvesting machines as at present arranged it frequently happens that in a crop infested with star thistles and other thistles and weeds the heads of such accumulate upon the upper sieve and flow over the back of same on to the lower sieve and elsewhere and so produce a very dirty sample of grain and frequently a great deal of the grain is lost.

According to our invention we provide an attachment to or an extension of the upper sieve which closes the space between the back or receiving end of the upper sieve and the bottom of the feed hopper and prevents such overflow and ensures a clean sample of grain, such attachment comprising a curved perforated sheet of material, preferably metal, hereinafter designated the thistle screen, which extends across the full width of the sieve, its lower edge being fastened upon the upper sieve at or near the rear edge of same (or being an extension of the same), and its upper edge fitting beneath the rear edge of the rake over which the crop passes from the hopper to the sieve, the thistle screen extending upwardly and rearwardly from its lower edge to its upper edge, and the perforations in same being of such size and number as will prevent the passage of any thistle heads or weeds but will permit the flow of sufficient blast over the top of the upper sieve to keep it clean.

In order that our invention may be the more clearly understood we will describe the same with reference to the accompanying drawings in which:—

Fig. 1 shows side and end views respectively of our thistle screen complete,

Figs. 2, 3 and 4 illustrate modifications in the method of attachment of the screen designed to suit various makes of machines, Fig. 5 illustrates on a larger scale portion of the perforated sheet of material forming the screen showing the preferred form of perforation, Fig. 6 is a sectional view showing the position of the screen in the machine in relation to the sieves, and Fig. 7 is a sectional view showing our screen made integral with or as an extension of the sieve.

In the drawings 8 represents a curved perforated sheet of metal forming our thistle screen which extends across the full width of the sieve 9, its lower edge being fastened to the sieve at or near the rear end of same, and which extends upwardly and rearwardly therefrom so that its upper edge fits beneath the bottom of the hopper 10, that is just beneath the rear edge of the rake 11 over which the crop passes from the hopper to the sieve 9. The perforations 12 in the sheet of material extend from just above its lower edge and are of such size and number as to prevent the passage of any thistle heads or weeds but will permit the flow of sufficient blast over the top of the upper sieve to keep it clean.

The lower edge of the sheet of perforated material is provided with an angle iron reinforcement 13, and preferably a light reinforcement is provided along the upper edge and sides. In the drawing Fig. 6 we have shown our screen attached to a long sieve. In this case the lower edge is fastened to the sieve by means of several bolts 14 which pass downward through the sieve and through a suitably shaped bar 15 on the underside of the sieve. The ends of the screen are shaped to fit to the frame of the sieve. When our screen is attached to a short sieve it is secured in place by bolts passing through horizontal holes in the screen and through corresponding holes in the rear frame bar of the sieve.

In the modification illustrated in Fig. 2 the angle iron reinforcement 13 does not extend the full width of the screen but has a laterally projecting angle iron bracket 16 fastened to each end with a bolt to pass through the frame of the sieve and thus hold the screen in position.

In the modification illustrated in Fig. 3 the angle iron reinforcement 13 extends the full width of the screen and has at each end an angle iron bracket 17 facing toward the discharge end of the sieve carrying downwardly projecting bolts which pass through perforations in the frame of the sieve and through a flat bar beneath the same.

We have illustrated various methods of attaching our thistle screen but it is obvious that many other methods of securing the same in place may be adopted.

When fitting our screen to a new machine we prefer to make it with a hinge 19 along the centre, as illustrated in Fig. 4, the upper portion 8$^a$ being secured to an angle iron bar 18 which extends across the riddle box and is held at each end by two plates fastened by screws to the sides of the riddle box, the hinged lower portion 8$^b$ being movable about the hinge 19 so that it may be lifted up when it is desired to change the sieves and lowered to the surface of the sieve when the machine is working. This portion 8$^b$ is held in contact with the sieve by means of screws 20 projecting from the lower ends of the bars 18 and passing through the edges of the screen with wing nuts on the outside. Strengthening pieces may be provided along the edges of the screen.

As a further modification of the constructions illustrated our thistle screen may be formed integral with the main body of the sieve that is as a continuation of the same, the perforated metal being fixed in a frame of suitably bent wood, iron or other material.

The operation of our invention is as follows: The crop to be cleaned flows from the hopper and down the rake 11. As it falls from the rake the blast passing through our thistle screen 9 lifts the light thistle heads and weeds and allows the grain to fall through them on to the sieve. Our screen 8 prevents the accumulation of thistle heads and weeds upon the sieve and their passage over the rear or receiving end of same. It ensures that the blast shall have free play upon the crop falling from the rake with the result that the grain filters through the thistle heads and weeds and flows down the sieve while the blast blows the thistles and weeds out over the discharge end of the riddle box. It effectually prevents the thistle heads and weeds from working back over the rear end of the sieve.

What we claim is—

1. An attachment for a sieve of a grain separator, comprising a curved sheet of perforated material provided at its lower edge with means whereby it may be held in engagement with the receiving end of the sieve with its convex side facing in the direction of travel of the grain.

2. An attachment for a sieve of a grain separator, comprising a curved sheet of material formed of hinged sections, the lower forward section being provided with adjustable means for holding it in engagement with the receiving end of the sieve.

3. An attachment for a sieve of a grain separator, comprising a sheet of perforated material, angle irons at the sides of the sheet and to which the rear section thereof is secured, and adjusting screws carried by the angle irons and passing through the forward section of said sheet for holding it in engagement with the receiving end of the sieve.

In testimony that we claim the foregoing as our invention we have signed our names in the presence of two subscribing witnesses this ninth day of January, 1925.

ARTHUR GUSTAV HENRY SPOEHR.
AUGUST CARL EDARDT SPOEHR.

Witnesses:
BRIAN JAMES TILBROOK,
REGINALD EDWARD MASTERS.